(12) United States Patent  
Schwartz et al.

(10) Patent No.: US 8,982,066 B2
(45) Date of Patent: Mar. 17, 2015

(54) AUTOMATIC ENDING OF INTERACTIVE WHITEBOARD SESSIONS

(75) Inventors: Edward L. Schwartz, Sunnyvale, CA (US); John Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 123 days.

(21) Appl. No.: 13/412,459

(22) Filed: Mar. 5, 2012

(65) Prior Publication Data

US 2013/0229333 A1 Sep. 5, 2013

(51) Int. Cl.
*G06F 3/041* (2006.01)
*G06F 1/32* (2006.01)
*G06F 3/042* (2006.01)

(52) U.S. Cl.
CPC ............ *G06F 1/3215* (2013.01); *G06F 1/3231* (2013.01); *G06F 1/3246* (2013.01); *G06F 3/0425* (2013.01); *Y02B 60/1289* (2013.01); *Y02B 60/32* (2013.01)
USPC .......................................... 345/173; 345/156

(58) Field of Classification Search
CPC .................................. G06F 3/01; G06F 3/011
USPC ........... 345/173–183; 348/14.01–14.09, 14.1, 348/14.11
See application file for complete search history.

(56) References Cited

U.S. PATENT DOCUMENTS

| 6,536,658 | B1 | 3/2003 | Rantze |
| 7,428,000 | B2 | 9/2008 | Cutler et al. |
| 7,961,943 | B1 * | 6/2011 | Zeevi ............................ 382/173 |
| 8,678,901 | B1 * | 3/2014 | Kelly et al. ...................... 463/16 |
| 2002/0163509 | A1 * | 11/2002 | Roberts ......................... 345/173 |
| 2003/0063431 | A1 * | 4/2003 | Sobolewski .................. 361/600 |
| 2005/0014118 | A1 * | 1/2005 | von Ahn Arellano ......... 434/322 |
| 2006/0149594 | A1 * | 7/2006 | Hilligoss et al. .................. 705/2 |
| 2006/0227120 | A1 * | 10/2006 | Eikman ......................... 345/175 |
| 2007/0069030 | A1 * | 3/2007 | Sauerwein et al. ...... 235/462.46 |
| 2007/0287494 | A1 * | 12/2007 | You et al. .................... 455/550.1 |
| 2009/0147272 | A1 | 6/2009 | Gibson et al. |
| 2009/0205031 | A1 * | 8/2009 | Sato et al. .......................... 726/7 |
| 2010/0045627 | A1 * | 2/2010 | Kennedy ........................ 345/173 |
| 2011/0037624 | A1 * | 2/2011 | Pance et al. ...................... 341/33 |
| 2011/0112892 | A1 * | 5/2011 | Tarantino ..................... 705/14.1 |
| 2011/0312349 | A1 * | 12/2011 | Forutanpour et al. ......... 455/466 |
| 2012/0188178 | A1 * | 7/2012 | Hamada ........................ 345/173 |

OTHER PUBLICATIONS

Antamedia Internet Café, <http://www.antamediacafe.com/>, Accessed Dec. 19, 2013, 3 pages.
CyberCafePro, <http://www.cybercafepro.com/>, Accessed Dec. 19, 2013, 1 page.
Krieger, Elmar, et al, "Models@Home: Distributed computing in bioinformatics using a screensaver based approach," Bioinformatics, vol. 18, No. 2, Accepted Sep. 17, 2001, pp. 315-318.
Loewe, Laurence, "Global computing for bioinformatics," Briefings in Bioinformatics, vol. 3, No. 4, Dec. 2002, pp. 377-388.
Miszczuk, Przemek, "CafeSuite Cyper Cafe Management Software," <https://web.archive.org/web/20120215162511/http://cafesuite.net/downloads>, Accessed Feb. 15, 2012, 100 pages.
True Café, <http://www.truecafe.net/index.php>, Accessed Dec. 19, 2013, 4 pages.
Zawinski, Jamie, "XScreenSaver versus XLock: History and Technical Comparison," <http://www.jwz.org/xscreensaver/versus-xlock.html>, Accessed Dec. 19, 2013, 3 pages.

* cited by examiner

*Primary Examiner* — Gene W Lee
(74) *Attorney, Agent, or Firm* — Blakely, Sokoloff, Taylor & Zafman LLP

(57) ABSTRACT

A method and apparatus is disclosed herein for automatically ending an interactive device session. In one embodiment, the system comprises a memory; and a processor coupled to the memory and operable to: log out a user, delete locally stored data created during a session, and place one or more system hardware components in a reduced power consumption state based on: occupancy sensor data indicating presence or absence of one or more individuals in proximity to an occupancy sensor, and activity information associated with a display surface.

18 Claims, 6 Drawing Sheets

AUTOMATIC ENDING OF INTERACTIVE WHITEBOARD SESSIONS

FIELD OF THE INVENTION

Embodiments of the present invention relate to the field of interactive devices, such as, for example, interactive whiteboards; more particularly, embodiments of the present invention relate to processes involved in automatically ending a session with an interactive whiteboard and other devices.

BACKGROUND OF THE INVENTION

Occupancy sensors, also called motion sensors or proximity detectors, detect if people are near the sensor. Typical sensors use passive infrared (PIR) technology. These detect infrared energy from moving objects. An example of this kind of sensor is the ZMOTION Detection Module from Zilog of Milpitas, Calif. Some sensors merely detect the presence of people (or objects confused with people). Other sensors may detect the distance from the sensor to the person or give other information about their location or direction of travel. Another type of sensor is an active infrared (IR) sensor with an emitter and receiver that detects reflections or interruptions of emitted IR radiation. Other sensors include ultrasonic proximity sensors, sound source localization sensors and sensing using computer vision.

A typical use of occupancy sensors is lighting control to automatically turn lights on and off. When used for this purpose, a sensor detects light and may also be used to disable lights automatically when another light source, for example daylight, is present. The primary benefit of using sensors for this purpose is to save power (to use less electricity) by turning off a light when it is not needed. In addition to lights, displays and other local devices can be controlled to save energy.

Another typical use of occupancy sensors is for intrusion detection as a part of a burglar alarm or other (physical) security system.

Sensors have been used for other purposes. For example, in some systems, sensors are used to control projectors. If an object (person) is detected within a minimum distance, the projector's output light intensity is reduced or the projector is turned off to avoid shining too much light into a person's eyes. In particular, these systems may be a mobile device that uses a laser projector. In some systems, a projector is also turned off if no one is detected in the area.

In some systems, sensors are used to control retail terminals such as kiosks. Sensors are used to detect if a person is proximate to the kiosk, approaching the kiosk or walking by the kiosk. The sensors are used to log traffic patterns with respect to the kiosk. The sensors trigger powering down a kiosk (causing it to be in a low power or energy saving mode) when no one is nearby. The sensor triggers playing a sound when someone walks by the kiosk. Some Kiosks handle sensitive information for brief periods of time. For example, some kiosks handle credit card payments. Avoiding data loss is not important for these kiosks since the sessions using sensitive information are short enough that interruption is infrequent and of a character such that they can be abandoned or restarted from the beginning if interrupted.

Screen savers or screen lock programs detect the lack of user interface (UI) activity (idle time) and lock a computer by taking over (disabling) the UI. Some screen savers also use time of day for determining when to activate. The normal display is replaced by an alternative display (sometimes to a dynamic display to avoid damage due to long term static display, sometimes to provide entertainment). While in this mode, user input devices such a keyboard and mouse no longer send events to running applications but instead are used to exit screen saver mode (either on any activity or on successfully entering a password or PIN). Except for the being disconnected from the UI, running application software and local storage are unaffected by the screen saver.

Some live teleconferencing, video conferencing or meeting recording systems track people. For example, sound source localization (SSL) is used to track a person who is speaking. The pan, zoom and/or tilt of a camera are controlled, a portion of the output of an omnidirectional video camera is selected or one of multiple cameras is selected to capture video of the person talking. Video from cameras is used for determining when people enter or exit a meeting room. When a person enters or exits, a camera view that shows the person is selected.

Logging out is important after people are done using computers at internet cafes and other public computers. Each period of use is a session. Some software used for this purpose ends the session based on a user action, such as the user logging off, shutting down the system or pressing a "log off" button, based on idle time (e.g., when a screen saver starts) or based on a network disconnect. Some software used for this purpose clears browser URL history and temporary files when a session ends. Some software automatically enables internet access on login and disables access on logout. Some software causes reboot, causes shutdown, closes programs used (closes all running applications), logs off the user or locks the terminal at the end of a session.

In grid computing (also referred to as volunteer computing or global computing), a personal computer runs a program (a computing application) for others while that computer would otherwise be idle. Some grid computing software appears to be a screen saver to a local user. Some software can be configured to consider a computer as not idle if a user that runs batch jobs is logged in. Some software is implemented as a system service so it runs when a no user is logged in.

There are a number of security and reliability concerns in grid computing. Some software saves intermediate results to minimize losses in case of a system crash.

SUMMARY OF THE INVENTION

A method and apparatus is disclosed herein for automatically ending an interactive device session. In one embodiment, the system comprises a memory; and a processor coupled to the memory and operable to: log out a user, delete locally stored data created during a session, and place one or more system hardware components in a reduced power consumption state based on: occupancy sensor data indicating presence or absence of one or more individuals in proximity to an occupancy sensor, and activity information associated with a display surface.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
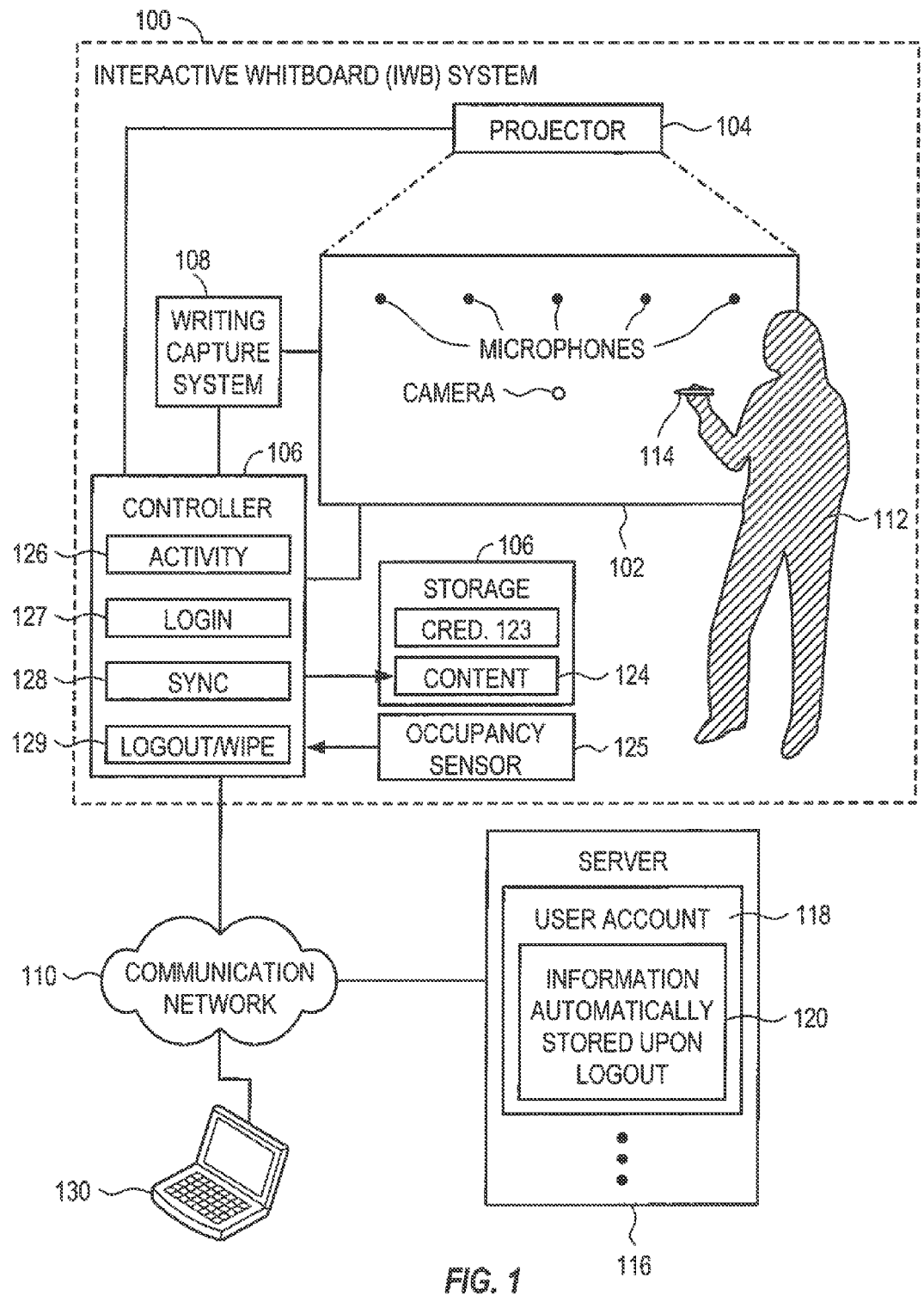
FIG. 1 is a block diagram of one embodiment of an Interactive Whiteboard (IWB) system.

Leaving information on a whiteboard is a common security problem. Some breaches of security caused by leaving writing on whiteboards cause big problems in a business setting. For example, information about a proposal by one vendor might be inadvertently disclosed to another vender. There are some situations (e.g., in patent law) when there is no remedy for inadvertent disclosure.

An interactive whiteboard (IWB) system (also called an electronic whiteboard) is disclosed herein. The system includes a projector (e.g., a short throw projector) that projects on a display surface of the board. The board is equipped with sensors that can detect writing, drawing and gestures using a pen-like stylus or a finger. The display surface and writing/drawing/gesture sensors are the user interface (UI) for the board.

In one embodiment, an interactive whiteboard (IWB) system (or other such interactive device) includes a network connection and has a sensor that detects when people are nearby. The IWB system provides temporary local storage of information, including information considered sensitive information. The IWB system syncs local storage to the cloud or a remote server on a network. After users leave the proximity of the sensor (which is determined at least in part based on information from the sensor), and after the IWB system confirms all data has been synced to the remote location, the IWB system deletes local storage and clears the display surface.

In one typical usage scenario, the user enters the area near the interactive whiteboard. The user notices that the board is ready for use. The user writes or draws on the board. The user decides to save the writing or drawing as a document and logs in. The user can continue to write/draw on the display surface and this document is automatically saved. The user may select a previously saved document which can be viewed and more writing/drawing can be added to it. The user can create more new documents. If the user remembers when finished, the user can logout. Otherwise, if the user leaves the area without logging out, the IWB system described herein will log out the user automatically when the system detects that no one is near the whiteboard and that whiteboard is not otherwise still being used.

In another typical usage scenario, the interactive whiteboard is used in a teleconference or remote meeting. The user logs into the local interactive whiteboard. An agenda from a remote location is displayed on the whiteboard. As the meeting progresses, other writing or drawing may be added to the information displayed from one or more remote locations. The local user may also write or draw on the board. Even if the local user does not write, draw or otherwise use the interactive whiteboard's user interface during the meeting, the user is not automatically logged out during the meeting. If the user remembers after the meeting ends, the user can logout. Otherwise, the IWB system described herein logs out the user automatically when the system detects that no one is near the whiteboard after the meeting ends and that whiteboard is not otherwise still being used.

In the following description, for the purposes of explanation, specific details are set forth in order to provide a thorough understanding of embodiments of the invention. However, it will be apparent that the invention may be practiced without these specific details.

FIG. 1 is a block diagram of one embodiment of an Interactive Whiteboard (IWB) system 100. IWB system 100 may comprise several components including a display surface 102, a projector 104, a controller 106, and a writing capture system 108. The components of system 100 depicted in FIG. 1 are meant for illustrative purposes only and are not intended to limit the scope of invention embodiments in any manner. Alternative embodiments may have more or fewer components than those shown in FIG. 1.

Display surface 102 (also sometime referred to as the "whiteboard" or "drawing surface" of the IWB system) provides both an input and an output interface for users of IWB system 100. As an input interface, it enables a user to provide writing (also referred to as drawing) input, which is then converted to digital information (also referred to as digital representation of the writing). As an output interface, digital information may be projected on to surface 102 by projector 104 such that the projected information can be viewed by one or more users of IWB system 100. One or more users of IWB system 100 may provide input to IWB system 100 by writing using one or more writing instruments. For example, as shown in FIG. 1, a user 112 may write on surface 102 using writing instrument 114. The term writing or drawing or writing information, as used in this application, may include one or more characters, letters, symbols, words, sentences, tables, drawings, sketches, figures, or any other type of input that can be provided using writing instrument 114. As another example, a writing or drawing can include hand-written letters, numbers, or symbols, expressed in any language or format. As yet another example, a writing or drawing can comprise a combination of hand-drawn pictorial and textual elements.

The user's writings made using the writing instrument are captured by writing capture system 108 and communicated to controller 106, which determines digital information corresponding to the writings. The digital information may then be communicated to projector 104 for projection on to surface 102. The digital information may be in various forms such as a time-ordered series of strokes, a pixel-based image, plain or formatted text, and the like.

A user of IWB system 100 may use various different writing instruments to write or provide input. In one embodiment, the writing instrument may be a physical object that may or may not leave a visible mark on surface 102. For example, a user may use his finger as a writing instrument to write on surface 102. Even though the finger may not leave any visible mark on surface 102, the finger's movements are captured and then translated to digital information, which may then be projected on surface 102. As another example, the user may use a pointer or a stylus as a writing instrument to write on surface 102, where the stylus may not leave any physical visible mark on surface 102. In other embodiments, a user may also use a writing instrument that leaves a visible mark on surface 102. For example, a user may use a pen or a regular dry erase marker to write on surface 102. The user's writings are captured, digital information corresponding to the writings determined, and the digital information then projected on surface 102.

In one set of embodiments, in addition to writing, a writing instrument 114 may also be used to interact in other ways with IWB system 100. For example, in one embodiment, writing instrument 114 may be used to erase previously written information.

Surface 102 may be a passive or active surface. In one embodiment, surface 102 may be a passive surface that simply accepts marks from a pen than can be identified by an external sensor like a camera. For example, display surface 102 may be a plain old opaque whiteboard. In another embodiment, surface 102 may be an active surface like a surface containing a sensor, for example from Wacom Co., Ltd in Japan. Such sensors contain an antenna and interact with Radio Frequency Identification (RFID) pens containing a passive coil. By activating the antenna in a specific way, the pen can be triggered and the antenna can measure the pen's response to the antenna and identify the pen's location and orientation. Other active surfaces include resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

Writing capture system 108 is configured to capture the writings made by a user using writing instrument 114. The writing information captured by writing capture system 108 may then be communicated to controller 106 for further processing. Writing capture system 108 may comprise one or more components that enable the writings made using writing instrument 114 to be captured. For example, in an embodiment where a writing instrument that leaves a visible mark on surface 102 is used, writing capture system 108 may comprise a camera that is positioned in front of surface 102 and configured to capture images of surface 102, where the captured images include the visible marks made on surface 102 using writing instrument 114. The captured images may then be communicated to controller 106, which is configured to process the images to determine digital information corresponding to the visible marks made on surface 102.

In another embodiment, writing capture system 108 may comprise one or more sensors that are configured to capture the motion or movement of the writing instrument when the user uses the writing instrument to write. The motion may be captured using different techniques. According to one technique, motion sensors may be placed along surface 102 that are capable of capturing the motion of the writing instrument in a 2-dimensional plane (or in three dimensions). The captured motion information may then be conveyed to controller 106, which may process the captured information to determine the user's writings and determine digital information corresponding to the writings.

In yet another embodiment, writing capture system 108 may comprise one or more pressure sensors that may be incorporated into surface 102 making surface 102 pressure sensitive. Such a pressure mapping multi-touch surface can be built from force sensitive resistor material sandwiched between a flexible electronic circuit like those available from TekScan, Inc. in South Boston, Mass. In such an embodiment, surface 102 may provide a multi-touch pressure sensing surface that can capture writing information based upon a user's touches on surface 102. The information captured by pressure sensors may then be communicated to controller 106 for further processing. In one embodiment, in addition to sensing a user's writing, the pressure sensors may also be able to determine the force with which a user writes on surface 102. This force information may also be communicated to controller 106 for further processing and analysis.

Writing capture system 108 may comprise two or more cameras and IR sources at the edges or corners of display surface 102, for example, four cameras and IR sources at the four corners, and may comprise a retro-reflective background around the perimeter of display surface 102. The cameras view and the IR sources illuminate parallel to display surface 102 to the background. Objects (e.g., pens, fingers, fists, etc.) that block the camera view of the reflected IR illumination are detected.

In yet another embodiment, surface 102 may be a capacitively-coupled input interface such as a surface found on an Apple iPad™ or iPhone™ device. In such an embodiment, surface 102 may enable a multi-touch input experience, zooming and panning capabilities, and the like. In such an embodiment, a user may use a finger or a conductive stylus to write on surface 102 and the writings may then be communicated to controller 106 for processing and analysis.

In order to be able to capture the writings made using writing instrument 114, in one embodiment, writing capture system 108 may be communicatively linked with writing instrument 114. This link, which may be wired or wireless, enables writing capture system 108 to capture the writings made using the writing instrument.

Occupancy sensor 125 generates data that indicates whether one or more users are near IWB system 100. In one embodiment, this data is motion data. Occupancy sensor 125 provides this data to controller 106. In one embodiment, this data is provided from occupancy sensor 125 to controller 106 via a USB connection.

Controller 106 acts as a central component for performing processing that controls and enables the various functions provided by IWB system 100. Controller 106 may be operatively coupled to one or more other components of IWB system 100 and configured to control and/or coordinate the functions performed by these components. For example, controller 106 may be operatively coupled to writing capture system 108 and/or to display surface 102 and configured to receive information captured by writing capture system 108. The information received by controller 106 from writing capture system 108 may be in various different formats such as pressure information, motion information, strokes information, and the like. Controller 106 is configured to process the received information and determine digital information corresponding to the received information. The determined digital information may then be communicated to projector 104 so that it can be projected on surface 102.

Figure 6:
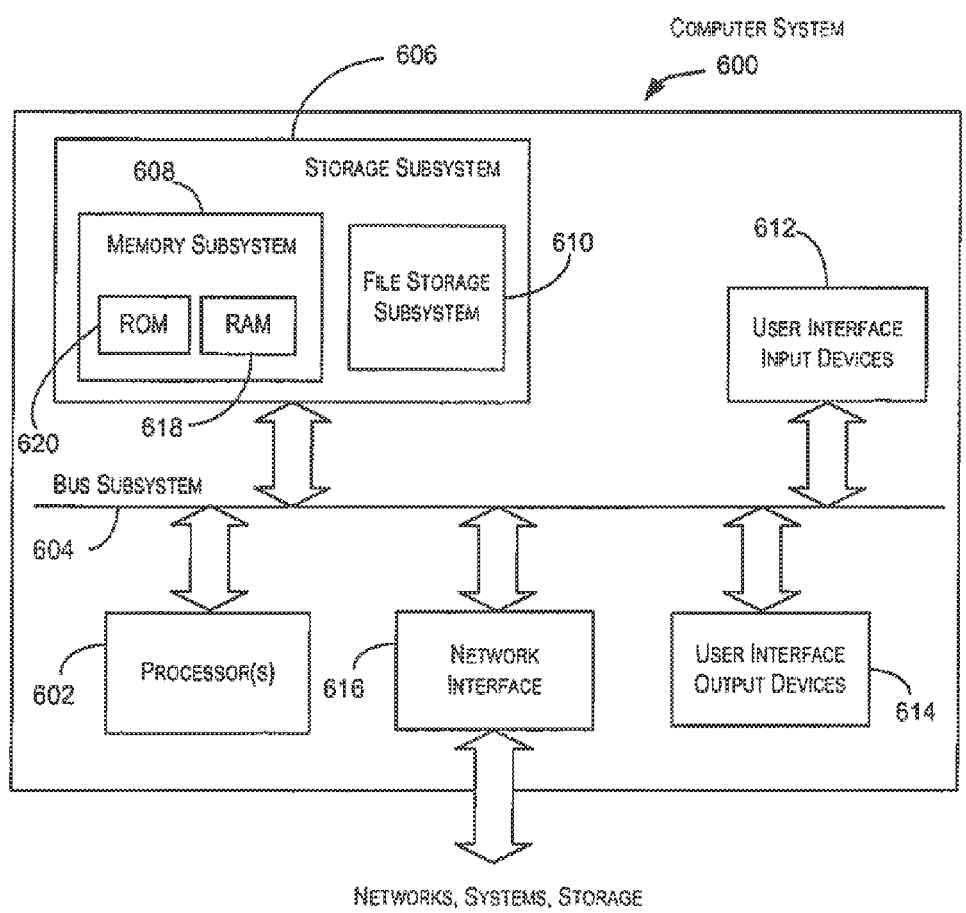
FIG. 6 is a simplified block diagram of a computer system that may be used to practice an embodiment of the present invention.

Controller 106 is typically a processor-based computing device. An example of controller 106 is depicted in FIG. 6 and described below. In alternate embodiments, controller 106 may be a processor, a programmable logic device, and the like. Controller 106 may execute one or more programs (code instructions), which when executed by a processor of controller 106, enable the processing performed by controller 106.

As described above, controller 106 is configured to determine digital information corresponding to information input using a writing instrument. In one embodiment, as part of this processing, controller 106 may be configured to determine strokes information based upon the information received from writing capture system 108 and then determine digital information corresponding to the strokes information. The strokes information may comprise information related to a collection of time-ordered strokes. In one embodiment, a stroke may correspond to data produced by a writing instrument from the time the writing instrument is engaged (i.e., used for writing) until the writing instrument is disengaged. For example, in one embodiment, a stroke may correspond to data produced by a writing instrument from the time the writing instrument makes contact with surface 102 until the contact is interrupted or broken. A stroke may be considered the most fundamental unit used for representing information input by a user using a writing instrument. Each stroke has an associated time component indicative of when the stroke was made. The information input or written by a user using writing instrument 114 may be represented by a series or set of time-ordered strokes. Controller 106 may then determine digital information corresponding to the strokes information.

In an alternative embodiment, writing capture system 108 may itself be able to determine strokes information and communicate the strokes information to controller 106. Controller 106 may then determine digital information directly from the information received from writing capture system 108.

The digital information determined by controller 106 may be stored locally in a nonvolatile storage 122. For example, the digital information determined by controller 106 may be stored as content 124 in storage 122. In one embodiment, the information received by controller 106 from writing capture system 108 or a portion of that information may also be stored locally as part of content 124.

Accordingly, controller 106 may receive raw sensor data captured by writing capture system 108 and then determine strokes information based upon the raw data or alternatively, may receive strokes information from writing capture system 108. Controller 106 may then determine digital information corresponding to the strokes information. In some embodiments, the digital information may be determined directly from the raw sensor data. The digital information determined by controller 106 is such that it reflects the writings made using writing instrument 114. For example, if the user writes a "W" on surface 102 using writing instrument 114 then the digital information determined by controller 106 may be a digital representation of "W". Controller 106 may then communicate the determined digital information to projector 104 for projection on surface 102.

Projector 104 is configured to project and display information received from controller 106 on display surface 102. In one embodiment, projector 104 receives a signal (e.g., a video signal) from controller 106 comprising digital information determined by controller 106 corresponding to writings made using a writing instrument. Projector 104 is configured to project or output the received signal on to surface 102 such that the digital information corresponding to the writings is output or displayed on surface 102 and made viewable to one or more users of IWB system 100. In one embodiment, the digital information corresponding to a writing is projected on to surface 102 in such a manner that the digital information is projected in the same location as the writing on surface 102. For example, if a user uses a writing instrument to write a "W" on surface 102, the digital information (e.g., the digital "W") is projected on to the same location of surface 102 where the user wrote the "W".

In one embodiment, projector 104 is a short throw projector that is positioned at a short distance in front of surface 102 such that it can project the digital information on to surface 102. For example, projector 104 may be an ultra-short throw projector that is positioned in front of surface 102 and projects the information received from controller 106 on to surface 102. An example of such a projector is the CP-AW250NM produced by Hitachi, Ltd. Other types of front throw projectors may be used in alternative embodiments. Projector 104 may project in different resolutions including high definition (e.g., 1920×1080) resolutions.

IWB system 100 may also comprise one or more devices for capturing other types of information such as audio, video, image, and/or other types of information. The information captured by these devices may be communicated to controller 106. Controller 106 may use this information to perform various types of processing. For example, in one embodiment, controller 106 may be configured to correlate the information captured using these devices with the digital information determined by controller 106 based upon the temporal attributes of the captured information and the digital information. In one embodiment, the information captured by the one or more devices may be stored locally in storage 122 as part of content 124. For example, the capture devices may include audio recording devices that are configured to capture audio information. According to one use case, IWB system 100 may be used in a corporate meeting setting and the microphones may capture audio information spoken by the meeting attendees. As shown in FIG. 1, in one embodiment, the microphones may be embedded in surface 102 to optimize the audio capture process. In alternative embodiments, the microphones may be separate from surface 102. The captured audio information may be communicated to controller 106 for processing and analysis.

IWB system 100 may also comprise one or more devices for capturing video and/or image information. These devices may include for example one or more cameras that are capable of capturing image or video information. In one embodiment, the cameras may be positioned so as to capture images or videos of users of IWB system 100. For example, as shown in the embodiment depicted in FIG. 1, a camera may be associated with surface 102 such that images of one or more users positioned nearby or in front of surface 102 can be captured. The captured video image information may be communicated to controller 106 for processing and analysis.

IWB system 100 may be coupled to a communication network 110 and be capable of communicating with other devices, including other IWB systems, systems, and storage connected to communication network 110. For example, as shown in FIG. 1, IWB system 100 may be communicatively coupled to one or more servers 116 or user computers 130 via communication network 110. Communication network 110 may be a single communication network or a collection of communication networks. The networks may include the Internet, an intranet, a local area network (LAN), a wide area network (WAN), a wireless network, a private network, a public network, a switched network, or any other suitable communication network that enables communications between IWB system 100 and other devices or systems coupled to communication network 110. One or more different communication protocols (e.g., Ethernet, various wireless protocols) may be used to facilitate the communications using communication network 110.

In one embodiment, controller 106 of IWB system 100 provides a network interface that couples IWB system 100 to communication network 110 and facilitates communications via communication network 110. IWB system 100 may be connected to communication network 110 via wired or wireless links.

Controller 106 may comprise one or more modules that provide the functionality provided by controller 106. These modules may be implemented in hardware, software, or combinations thereof. For example, in one embodiment, a module may be implemented in software (program, code, instructions), which when executed by a processor of controller 106 provides the functionality provided by the controller. In one embodiment, as depicted in FIG. 1, controller 106 comprises an activity module 126, a login module 127, sync module 128 and a logout module 129.

Activity module 126 determines if there is activity occurring with respect to IWB system 100. Such activity may be indicated by data from occupancy sensor 125 indicating one or more users is within the vicinity of IWB system 100. Other forms of activity include the writing capture system 108 capturing data from one or more users interacting with the display surface of IWB system 100. In one embodiment, activity module also determines if content is being displayed on the display surface of IWB system 100 from another source (e.g., a remote IWB) as will be discussed in more detail below. Such activity may be determined based on network communication received by controller 106 from other sources. In one embodiment, if a person logs in to IWB system 100 as determined by login module 127, login module 127 signals activity module 126 and activity module 126 determines the activity is occurring with respect to IWB system 100. If activity module 126 determines that no activity is occurring for a predetermined period of time (e.g., 10 minutes), then activity module 126 signals logout module 129.

Login module 127 is a client that provides an interface for logging into user account 188 on server 116. In the login procedure, login module 127 communicates via communication network 110 to server 116. Login module 127 sends information provided by user (e.g., username and password, RFID, etc.) to the server. The server responds with a success or failure indication and may provide credentials such as, for example, a cookie, token or cryptographic key. The communication many use LDP, OAuth or another protocol.

It should be appreciated that, while IWB system 100 enables user logins, these logins are not a prerequisite for using the various features of IWB system 100 described above. For example, a user does not need be logged into IWB system 100 in order to be able to use IWB system 100 as described above.

After login, sync module 128 automatically saves data to the account for the user that logs in. It may save when the user changes pages, at logout time and/or periodically.

In one embodiment, upon a successful login, login module 127 is configured to also send a signal to activity module 126 indicating that a successful login has occurred. Login module 127 may send a signal to sync module 128 which includes information provided to or determined by login module 127 as part of the login procedure. For example, in one embodiment, the credential provided to login module 127 by the user may be provided to sync module 128.

After a user logs in, various different actions may be initiated responsive to a login. In one embodiment, the user's credentials 123 (e.g., cookie, OAuth token, cryptographic key, etc.) are stored in storage 122.

In one embodiment, after login, the one or more actions that are automatically initiated use content that has been created and stored prior to the login. Accordingly, when a user logs into IWB system 100, content 124 may have already been created and stored by IWB system 100 prior to the login. This content may comprise, for example, digital information determined by controller 106 corresponding to inputs provided by a user using a writing instrument prior to the login. Content 124 may also comprise other types of information (e.g., audio, video, image information) captured by devices of IWB system 100 prior to the login. Accordingly, content 124 may comprise content information created and stored using IWB system 100 prior to the login. In one embodiment, the one or more actions that are automatically initiated responsive to the login use the content, or a portion thereof, created and stored by the IWB system prior to the login.

IWB system 100 may continue to capture user writings, determine digital information corresponding to the writings, project the determined digital information on to surface 102, and store the determined digital information as part of content 124 after a login. Portions of content 124 may be periodically stored to the user account corresponding to the first user. Likewise, if a second user logs in to share a document, the portions of content 124 that have been stored may be periodically communicated to the second user.

Logout module 129 logs a user out from IWB system 100 and removes data (e.g., wipes data from) IWB system 100. In one embodiment, logout module 129 is responsive to an input from activity module 126 indicating that there hasn't been activity for a predetermined period of time. In response to the input, logout module 129 logs the user out. In another embodiment, in response to an input from activity module 126 indicating no activity, logout module 129 performs one or more actions automatically. Examples of actions that may be automatically performed in response to a logout are listed below. This list is not intended to be restrictive. One or more of the actions listed below may be performed automatically as part of a logout process:

(1) Storing content 124 (or a portion thereof), which are created while logged in, to an account corresponding to a user. For example, as shown in FIG. 1, a server 116 coupled to IWB system 100 via communication network 110 may provide storage for multiple user accounts. The action performed responsive to the logout process may include storing content 124, or a portion thereof, as information 120 associated with a user account 118 on a remote server (e.g., a cloud-based account). This stored information 120 may then be accessed by the user by logging into user account 118. For example, a user may use a computer 130 to log into user account 118 and find information 120 stored under the user account. Content from multiple IWB systems may be stored to the same user account responsive to the user logging out of the multiple IWB systems.

(2) Communicating content 124 (or a portion thereof), which are created and stored while logged in. For example, content 124 may be attached to an email and the email sent to the user upon automatic logout.

(3) Clear the display surface of IWB system 100. This may be performed by disabling projector 104, erasing the display surface, and/or covering the content on the display surface to prevent it from being viewed.

(4) Attempt to sync data to cloud or server (e.g., server 116).

(5) Wipe credentials 123 from memory (e.g., storage 122).

(6) Wipe local data already synced to the cloud or server (e.g., server 116).

(7) Wipe unencrypted local data stored in memory (e.g., storage 122).

As described above, in an IWB system, a user's writings are converted to digital information, which is then projected and displayed on a surface of IWB system 100. Converting the "written" information to digital information enables several operations, which can be performed on electronic information, to be now performed on information written on a whiteboard.

The IWB system may be used in a collaborative setting. For example, two or more IWB systems may be internetworked via a communication network (such as the Internet) and be used in a collaborative manner.

Figure 2:
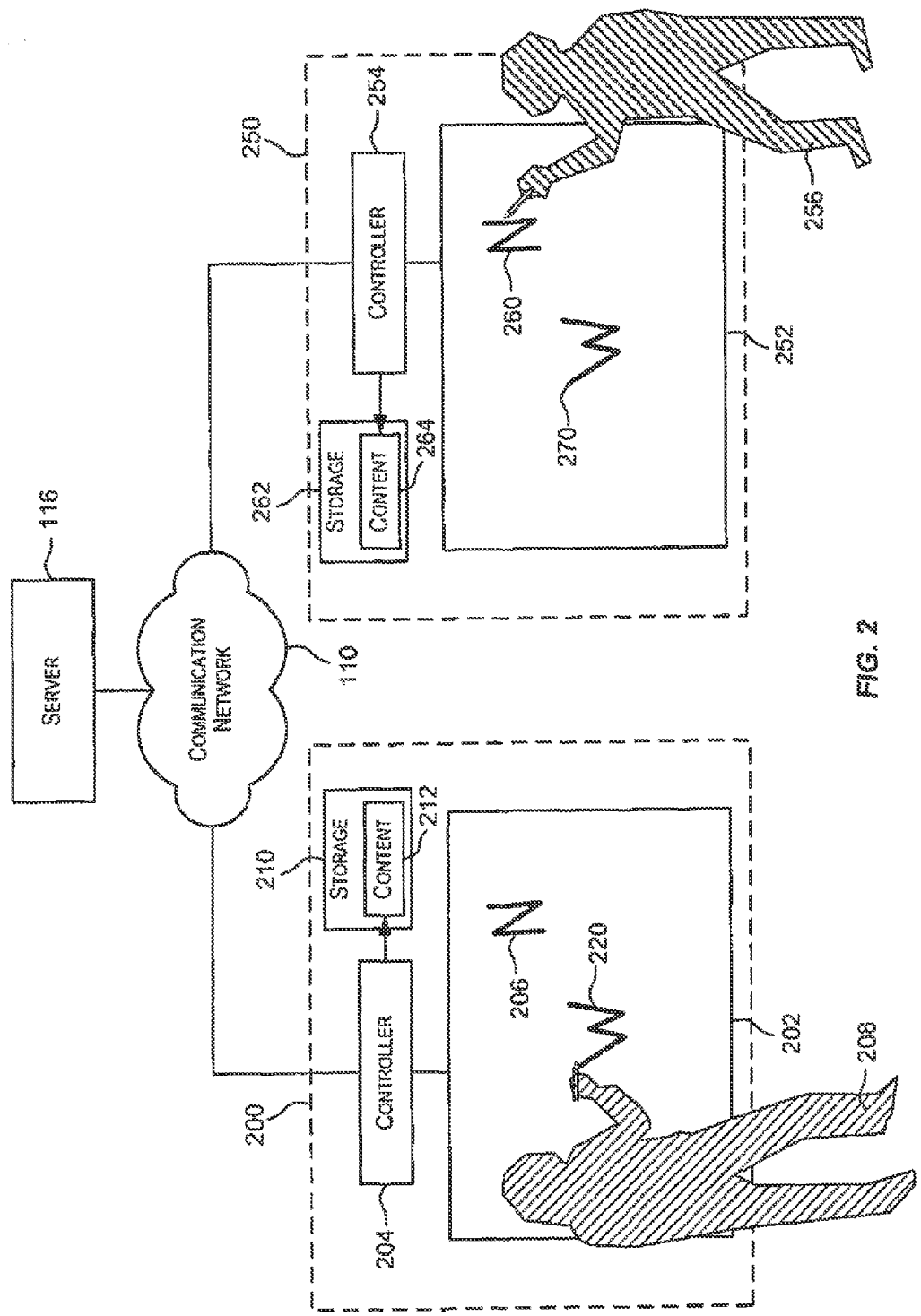
FIG. 2 is a block diagram of a network environment in which multiple IWB systems are networked via a communication network and participate in a collaborative session according to an embodiment of the present invention.

FIG. 2 is a block diagram of a network environment in which multiple IWB systems are networked via a communication network and participate in a collaborative session according to an embodiment of the present invention. As shown in FIG. 2, an IWB system 200 is communicatively coupled with another remotely located IWB system 250 via communication network 110. IWB system 200 and IWB system 250 can each be substantially similar in configuration to IWB system 100 depicted in FIG. 1.

The controller of each IWB system may provide an interface to communication network 110. For example, in FIG. 2, controller 204 may provide a network interface coupling IWB system 200 to communication network 110 while controller 254 may provide a network interface coupling IWB system 250 to network 110.

IWB systems 200 and 250 may participate in a collaborative session. During such a collaborative session, the IWB systems communicate information with each other such that any information written by a user at one of the IWB systems is projected and displayed on the display surfaces of the other IWB systems participating in the session. The information written at an IWB system may also be projected and displayed on the display surface of that IWB system. In this manner, the information written on the surface of one IWB system is also displayed on surfaces of the other remote IWB systems involved in the session. This enables remotely located IWB systems to be used collaboratively wherein remotely located users can interact as if writing on the same whiteboard.

For example, in FIG. 2, a user 208 local to IWB system 200 may use a writing instrument to write on surface 202 of IWB system 200. The writing is captured by a writing capture system of IWB system 200 and controller 204 of IWB system 200 determines digital information corresponding to the written information. The digital information determined by controller 204 may then be displayed on surface 202 of IWB system 200. Controller 204 may also communicate the digital information to the IWB system 250 where it is projected and displayed on display surface 252. In this manner, information written by user 208 on surface 202 is displayed and can be viewed by both users of IWB system 200 and IWB system 250. For example, in FIG. 2, the letter "W" 220 written by user 208 at IWB system 200 is projected on surface 202 and also on surface 252 (as "W" 270), thereby enabling users of both IWB systems to view the information. In a similar manner, for any information written on surface 252 of IWB system 250, controller 254 is configured to determine digital information corresponding to the written information and cause the determined digital information to be projected and displayed on surface 252 of IWB system 250 and also on surface 202 of IWB system 200. For example, in FIG. 2, the letter "N" 260 written by user 256 at IWB system 250 is projected on surface 252 and also on surface 202 (as "N" 206), thereby enabling users of both IWB systems to view the information. The manner in which the information is projected at both the IWB systems gives the feel that users of IWB system 200 and IWB system 250 are writing on the same display surface or whiteboard in a collaborative environment.

Accordingly, for IWB systems participating in a collaborative session, the information projected by each IWB system may comprise digital information corresponding to writings captured locally at that IWB system and also digital information received from other remote IWB systems participating in the collaborative session, where the digital information received from a remote IWB system comprises digital information corresponding to information written locally at that remote IWB system. For example, in FIG. 2, the information projected at IWB system 200 includes digital information corresponding to letter "W" written locally at IWB system 200 and also digital information received from IWB system 250 corresponding to letter "N" 260 written locally at IWB system 250. In one embodiment, both pieces of digital information (i.e., the digital information corresponding to local writings and the digital information received from a remote IWB system corresponding to writings made locally at that remote IWB system) may be cached locally by controller 204 of IWB system 200. For example, the information may be stored as content 212 in a storage 210 local to IWB system 200. In a similar manner, controller 254 of IWB system 250 may store digital information corresponding to local writings at IWB system 250 and the digital information received from IWB system 200 corresponding to writings made locally at IWB system 200 as content 264 in a local storage 262 of IWB system 250.

One or more of the IWB systems participating in a collaborative session may comprise occupancy sensors. An occupancy sensor that indicates whether one or more users are near IWB system 200 may provide data to controller 204 which is then communicated to IWB system 250. An occupancy sensor than indicates whether one or more users are near IWB system 250 may provide data to controller 254 which is then communicated to IWB system 200.

As previously described, each IWB system may also comprise devices for recording other types of information such as audio/video image information. For IWB systems participating in a collaborative session, an IWB system may receive information captured locally at that IWB system and also information captured locally at other IWB systems participating in the collaborative session. For example, controller 204 may receive information captured by devices local to IWB system 200 and also receive, from IWB system 250, information captured by devices local to IWB system 250. In one embodiment, controller 204 may also store this information as part of content 212 in local storage 210. In a similar manner, controller 254 may receive information captured by devices local to IWB system 250 and also receive, from IWB system 200, information captured by devices local to IWB system 200. In one embodiment, controller 254 may also store this information as part of content 264 in local storage 262.

There are various ways in which an IWB system may receive information captured at one or more remote IWB systems. In one embodiment, IWB system 200 may be connected to IWB system 250 over a LAN or WAN using a shared messaging service that complies with the Java Message Server (JMS) specification. Each stroke captured from either the remote or local IWB system can be published to the same channel or "topic" at the JMS and all connected devices subscribed to that topic receive the messages. In this manner, any stroke published to the channel is received by all IWB systems. The shared messaging service may use the Extensible Messaging and Presence Protocol (XMPP). One skilled in the art will recognize that there are many systems for sharing information over a LAN or WAN and many means for doing so.

As described above, according to an embodiment of the present invention, sync module 128 automatically saves data to the account for the user that logs in. For an IWB system participating in a collaborative session, the information synced may include information determined or captured locally at the IWB system (e.g., digital information determined at that IWB system, information captured by devices local to the IWB system) and also information received from other IWB systems participating in the collaborative session (e.g., digital information and captured information received from remote IWB systems participating in the collaborative session). For example, for IWB system 200, sync module 128 in controller 204 may save the prior stored content 212 to an account corresponding to the login, where the account may be stored on a server 116 coupled to IWB system 200 via communication network 110.

As described above, according to an embodiment of the present invention, responsive to a lack of activity at IWB system 200 as determined by activity module 126, logout module 129 logs a user out from IWB system 200 and removes data (e.g., wipes data from) IWB system 200.

Although only two IWB systems are shown in FIG. 2, this is not intended to limit the scope of embodiments of the present invention. Any number of IWB systems may be involved in a collaborative session. It is also possible for an IWB system to be simultaneously involved in multiple separate collaborative sessions. For example, in FIG. 2, IWB system 200 is involved in a collaborative session with IWB system 250. Simultaneous with this session, IWB system 200 may also be involved in a separate collaborative session with a third IWB system (not shown), where IWB system 250 is not a participant in that separate session.

An Example of Controller Processing

Figure 3:
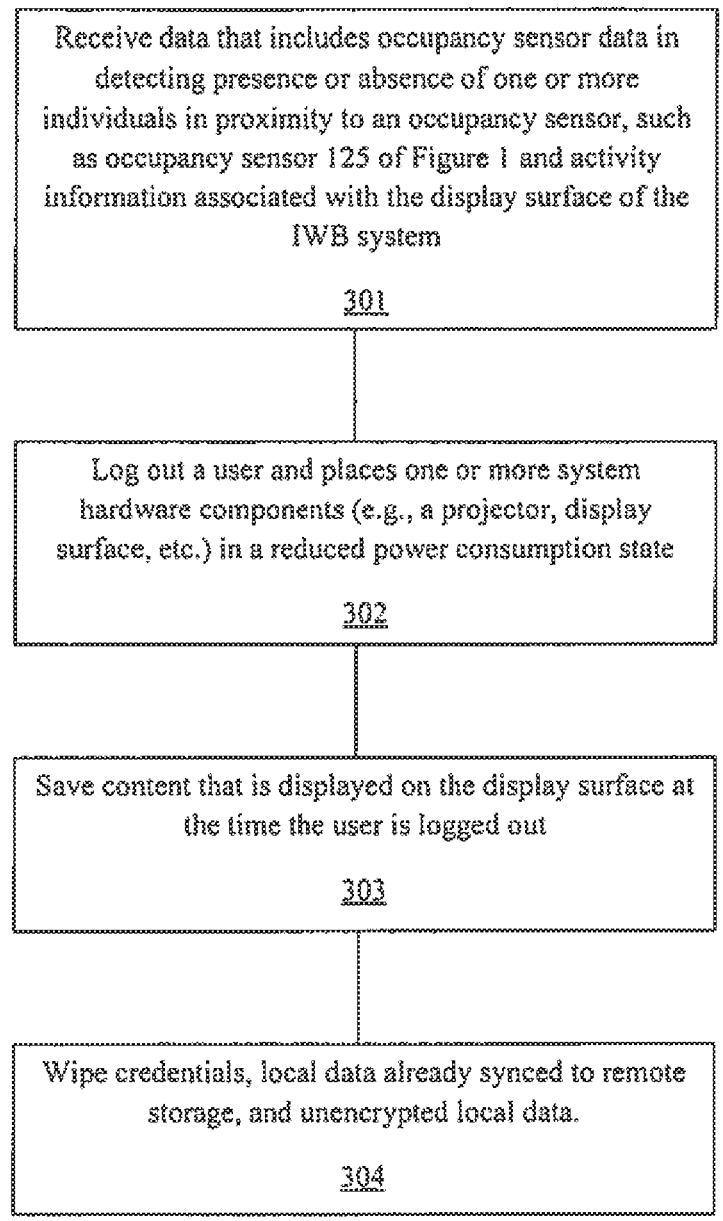
FIG. 3 is a flow diagram depicting processing performed by an IWB system according to an embodiment of the present invention.

FIG. 3 depicts a flow diagram 300 depicting processing performed by an IWB system according to an embodiment of the present invention. The processing depicted in FIG. 3 may be performed by one or more components of the IWB system such as a controller of the IWB system. The processing may be performed using software (e.g., code, instructions, program) executed by a processor of the controller, hardware of the controller, or combinations thereof. In one embodiment, the software executed by a controller may be stored on a non-transitory computer-readable storage medium.

Referring to FIG. 3, the controller receives data that includes occupancy sensor data indicating presence or absence of one or more individuals in proximity to an occupancy sensor, such as occupancy sensor 125 of FIG. 1, and activity information associated with the display surface of the IWB system (301). The activity information comprises data corresponding to content displayed on the display surface as a result of one or more users interacting with the display surface or content displayed on the display surface from a remote location (e.g., content from a remotely located IWB system).

In response to receiving the data, the controller logs out a user and places one or more system hardware components (e.g., a projector, display surface, etc.) in a reduced power consumption state (302).

In one embodiment, the controller saves content that is displayed on the display surface at the time the user is logged out (303). This saving operation may include saving the content to a cloud-based storage or other remote storage facility.

In one embodiment, the controller wipes credentials, local data already synced to remote storage (e.g., the cloud), and unencrypted local data (304). In one embodiment, the controller also removes from view the content display on the display surface at the time of logging out the user. This may be performed by disabling the projector output, obscuring the content on the display surface (e.g., blackout the display surface), or by erasing the display surface.

Figure 4:
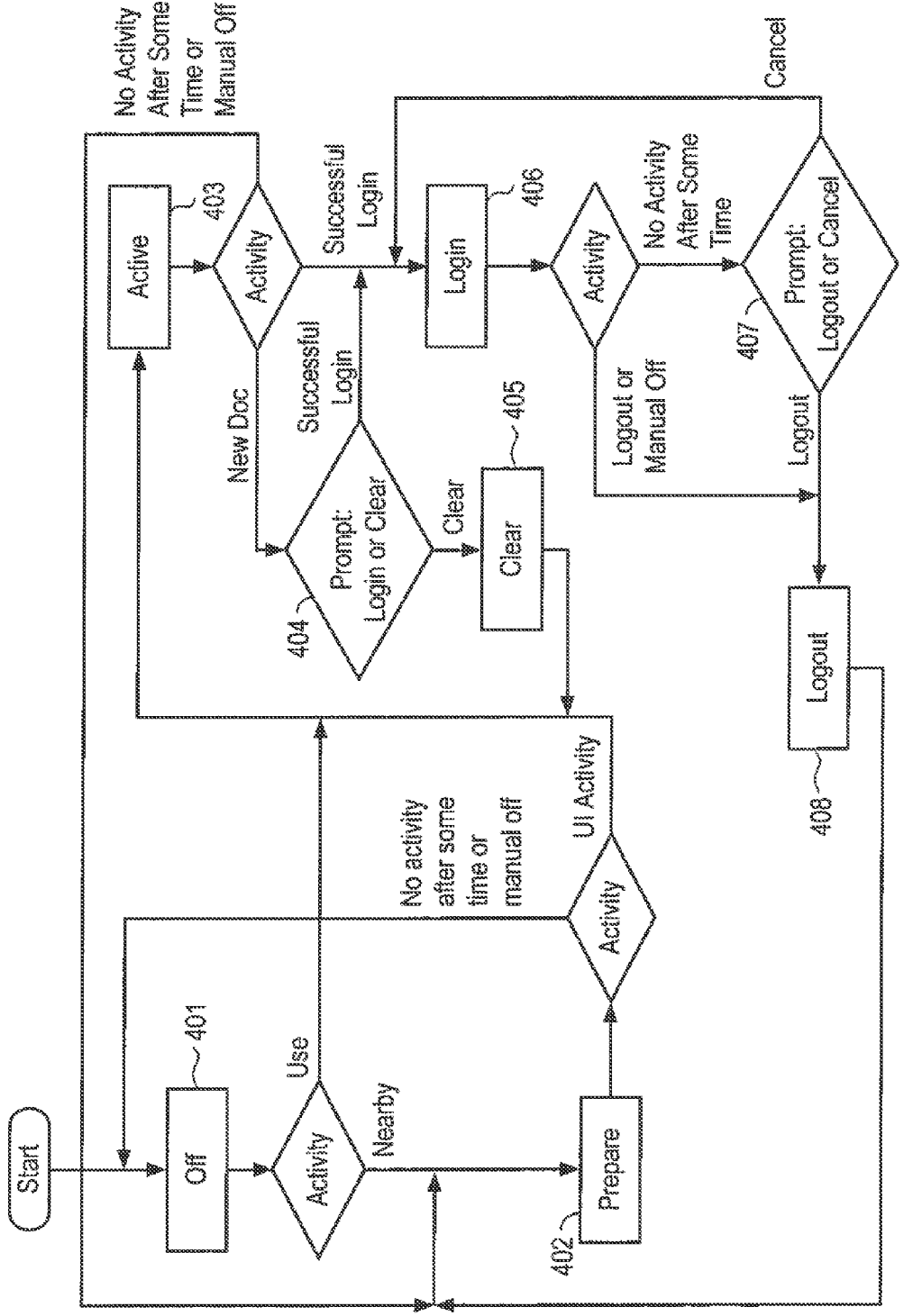
FIG. 4 illustrates the operation of one embodiment of the controller using the activity, login and logout modules.

FIG. 4 illustrates the operation of one embodiment of the controller using the activity, login, sync and logout modules described herein. The controller proceeds through a number of states based on whether there is activity. These states include off 401, prepare 402, active 403, prompt "login or clear" 404, clear 405, login 406, prompt "logout or cancel" 407, and logout 408.

Off 401

When the IWB system enters the "off" state, the controller (e.g., controller 106, controller 204, controller 254, etc.) turns off the display and may control other components of the IWB system by putting them in a reduced power consumption state. Placing various components including the display surface in a reduced power consumption state includes causing them to go to a low power state or a power saving state or having their power removed. In one embodiment, entering the "off" state does not delete unsaved data. If there is data waiting to be synced to the remote storage (e.g., cloud, storage 120), the controller optionally makes occasional attempts to sync the data to a server.

While in the "off" state, the controller waits for activity. If UI activity (e.g., interacting with the display surface) occurs, the controller transitions the IWB system to the "active" state. If an occupancy sensor detects people nearby the IWB system, the controller goes to the "prepare" state.

Prepare 402

When the IWB system enters the "prepare" state, the controller erases the display, but it does not delete unsaved data. If this state was entered in response to a "manual off" command, the system goes to the "off" state. Otherwise, in one embodiment, while the system remains in the "prepare" state, system components are set to a state where response to a user is quick but distractions are reduced. If there is data waiting to be synced to remote storage, the controller optionally makes occasional attempts to sync the data to a remote server. In some systems, erasing the display is accomplished by controller causing the display surface to display a mostly black screen with a logo and/or a message similar to "touch to begin" in an appropriate language. The logo and/or text may occasionally move to a different location to avoid creation of a static display. In some systems, the display is in an "eco" mode to reduce fan noise. If UI activity occurs, the system goes to the "active" state. If the occupancy sensor does not detect people nearby in a preset amount of time (e.g., 16 minutes) or if a "manual off" command occurs, the system goes to the "off" state.

Note that for the example amounts of times, 10 minutes of inactivity in the "login" state followed by 5 additional minutes of inactivity in the "Prompt 'Logout or Cancel'" state equals 15 minutes which is 1 minute less than 16 minutes for going to the "off" state. Other time intervals may be used. When using other values for amounts of times, in one embodiment, the amount for going to "off" is greater than the maximum of the "active" and "login" amounts plus the maximum of the "prompt . . . " amounts.

Active 403

When the IWB system enters the "active" state, the controller initializes the IWB system for an interactive whiteboard session. The normal UI is displayed on the display surface. The IWB system can be used and data may be saved locally to non-volatile storage (e.g., storage 122) but data cannot be saved to a user's account (e.g., user account 118) on a server on the network. If previous unsaved data is present, it is displayed. Otherwise, initialization for securely storing local data is done as described in the Storage and Syncing section below. If there is data waiting to be synced to remote storage, the IWB system optionally makes occasional attempts to sync the data to a server (e.g., server 116). If a "manual off" command occurs or if there is no activity in this session after some time (e.g., 10 minutes), the system goes to the "prepare" state to wait until there is activity. In one embodiment, such activity can be either use of the IWB system or people detected nearby by the occupancy sensor. If a successful login occurs, the IWB system goes to the "login"

state. If a "new document" ("new doc") request occurs and there is unsaved data, the IWB system goes to the "Prompt 'login or clear'" state.

In one embodiment, users are associated with accounts by an identifier (such as a username), a secret and/or a public/private key pair. In some systems, people with user accounts have RFID tags and swipe the tags near a RFID reader to attempt login (e.g., a secret identifying a user is stored by a RFID tag). If a server recognizes the RFID, login is successful for the user account matching the RFID.

In another embodiment, a device using Near Field Communication (NFC) or other type of short range radio may be used. In yet another embodiment, a cell phone or other personal device may be used for login. Other types of badges or ID cards can be used for login. In still another embodiment, people can enter and username and password or PIN to login. In another embodiment, biometric information can be used for login. In one embodiment, for systems using a secret for login, the server does not store the secret for login but instead stores the cryptographic hash of the secret.

Prompt "Login or Clear" 404

When the IWB system enters the "Prompt 'Login or Clear'" state, the controller causes the display surface to display a message similar to "login or clear" in an appropriate language. If the user successfully logs in, the IWB system goes to the "login" state. If the user chooses clear the display surface, the system goes to the "clear" state. Optionally, if no choice occurs after some time (e.g., 5 minutes), the IWB system goes to the "prepare state".

Clear 405

When the IWB system enters the "clear" state, the controller causes any unsaved data from the current session to be deleted and ends the current session. The IWB system goes to the "active" state. Note that in one embodiment the "clear" state is the only state where the controller causes data that is not synced to be intentionally discarded and the "clear" state can only be entered by an explicit user action.

Login 406

When the IWB system enters the "login" state, the controller initializes the IWB system for syncing local data to a server (e.g., server 116) on the network. The normal UI is displayed on the display surface. The IWB system can be used, data is saved locally and data is synced to the remote server either periodically or in response to events such as changed pages. In one embodiment, attempts are made to sync the data and if saving fails due to a network or server problem, syncing is attempted again later. Securely handling data is done as described in the Storage and Syncing section below. Previously synced data may be loaded (e.g., documents from previous sessions from any IWB system connected to the remote server or uploaded to the remote server using a personal computer.). If there is data from a previous session waiting to be synced, the IWB system optionally makes occasional attempts to sync the data to a remote server. If "logoff" or "manual off" occurs, the IWB system goes to the "logoff" state. After some time (e.g., 10 minutes) in which no activity occurs, the IWB system goes to the "prompt 'logout or cancel'" state. To prevent entry into the logout or cancel state, activity must occur. Activity is either of use of IWB system or people detected nearby by the occupancy sensor. Activity is also use of a remote device or people detected nearby a remote device by an occupancy sensor when another IWB system on the network accesses the same document being displayed on the local IWB system or is sharing a session with it.

Multiple users may access the same document. If users of two or more different IWB systems login and open the same document, they can interact with it and each other. Some devices share strokes (e.g., handwriting using a stylus, pen, mouse, finger or other pointing device). Some devices display silhouettes or other cartoon representations of people at the different locations.

For an IWB system that is in the "login" state, if another user attempts to login, the IWB system displays a choice of "share" or "switch" on the display surface. If "share" is chosen and the login was successful, the user is given access to the document (or session)—that is, the second user can later access the document (or multiple documents from a session) from this or another device connected to the remote server or via an alternative method of accessing the server (e.g., accessing a document on the server using a web browser on a personal computer). If "switch" is chosen, the IWB system goes to the "logout" state and then the IWB system continues to handle the login.

Prompt "Logout or Cancel" 407

When the IWB system enters the "Prompt 'logout or cancel'" state, the IWB system displays a message on the display surface similar to "logout or cancel" in an appropriate language. If "cancel" is chosen, the IWB system goes back to the "login" state. If "logout" is chosen, the IWB system goes to the "logout" state. If no choice is made after some time (e.g., 5 minutes), the IWB system goes to the "logout" state.

Logout 408

When the IWB system enters the "logout" state, the controller ends a session. If possible, the controller causes all data from the session to be synced to remote storage. If a network or server error prevents syncing of the data, the data becomes "data from a previous session waiting to be synced" and attempts will be made by the controller to sync the data later. Securely storing this data waiting to be synced so it is not accessible by future users of the IWB system is done as described in the "Storage and Syncing" section below. In one embodiment, the IWB system is wiped (cleaned). Any local data from the session is deleted; any login secrets or credentials such as cookies, OAuth tokens, RFID values or passwords are deleted from the IWB system; any user identification such as username or pictures is deleted from the device; and there is no sensitive information remaining on the device—any remaining data is encrypted such that the local device cannot decrypt it.

Storage and Syncing

In one embodiment, secure storage and syncing is performed as follows. A crypto key is generated for each document for each session. The document is encrypted with this key for local storage on the device and for transmission to the server. This key is held in memory on the local IWB system while the session is active. When a user logs in, a public key for the user is provided to the local IWB system. A public key is used to encrypt random keys to allow the corresponding user decrypt to saved data in the future. The public key encrypted random keys are transmitted to the server and may be stored locally on the device if they cannot be transmitted immediately.

While the local IWB system has the key for a document and session, the document can be accessed on the device. Once the key is no longer stored on the local IWB system, even if the encrypted files remain, the document cannot be decrypted by the local IWB system. The private key corresponding to the public key is never provided to the IWB system, so anything encrypted with the public key can never be accessed by the local IWB system. Having files remain on the IWB system for future syncing that are encrypted such that they cannot be decrypted by the IWB system allows for the goals of (1) never losing data and (2) clearing sensitive data at the end of the session to be accomplished in the case when a network or server error prevents syncing at the end of a session.

There are a number of alternative ways to accomplish secure storage and syncing. These include the following. In one embodiment, local data is encrypted at rest, that is, local data is only saved to non-volatile local storage (such as a hard disk) in encrypted form. For data that needs to be used (read) by the device, encryption for local storage can use one or more randomly generated keys that are specific to a session. In some devices, an encrypted disk image is used for local storage during a session. In other devices, an encrypted file system is used for local storage during a session. In other devices, files are encrypted independently. For example, each document can have a randomly generated key used for encrypting all files for that document or have randomly generated keys for each files. Keys may also be generated by a secure, non-random process such as a cryptographic hash.

In another embodiment, data is encrypted during network transmission. In some systems, the network connection is encrypted with an encrypted method such as SSL (HTTPS) or ssh. Alternatively, the data may be encrypted before it is sent on the channel. For example, either independently encrypted files can be sent or the encrypted files managed by an encrypted file system can be sent.

Saving to a user account after login can accommodate encryption in a number of different ways. In one embodiment where individual files are encrypted with session and document specific keys, the keys are securely transmitted to the remote server to be stored for the logged in user (or multiple users if a document is shared). In one embodiment, a key or keys is transmitted as part of a successful login. While the session is active, the device can save encrypted data locally and sync that data to the remote server if the server and network connection is working. When the session ends, the IWB system forgets the session and document specific keys (e.g., the program variable storing the keys is cleared).

In one embodiment, at the end of a session, the encrypted local data is synced to a remote server and the encrypted local data is deleted. If there is a network or server problem, the encrypted local data becomes "data waiting to be synced". Since the data is encrypted with a key that is no longer stored on the IWB system, it is not sensitive data. After normal network and server operation is restored, the encrypted data can be synced and then deleted.

In one embodiment, saving data to a user's account involves public key cryptography. A user account has an associated public key. Either data can be encrypted with a user's public key, or random keys (used for encrypting data) can be encrypted with a user's public key. In one embodiment, a public key is provided to a device when a user logs in. There may be an alternative method for providing public keys to the IWB system to handle the case of network or server errors such as having a personal device (e.g., a cell phone) store the public key or caching public keys on devices.

In one embodiment, a particular account (e.g., an account controlled by an administrator) is used for saving data when no user logged in for the case when the local device fails (e.g. there is a power failure or software crash). In other systems, failures before login may lose data.

Some IWB systems may use security features such as Intel Trusted Execution Technology, ARM TrustZone or Trusted Platform Module.

Security of the server and management of keys and sensitive information on the server is well-known in the art.

Sensor Adjustment

Figure 5:
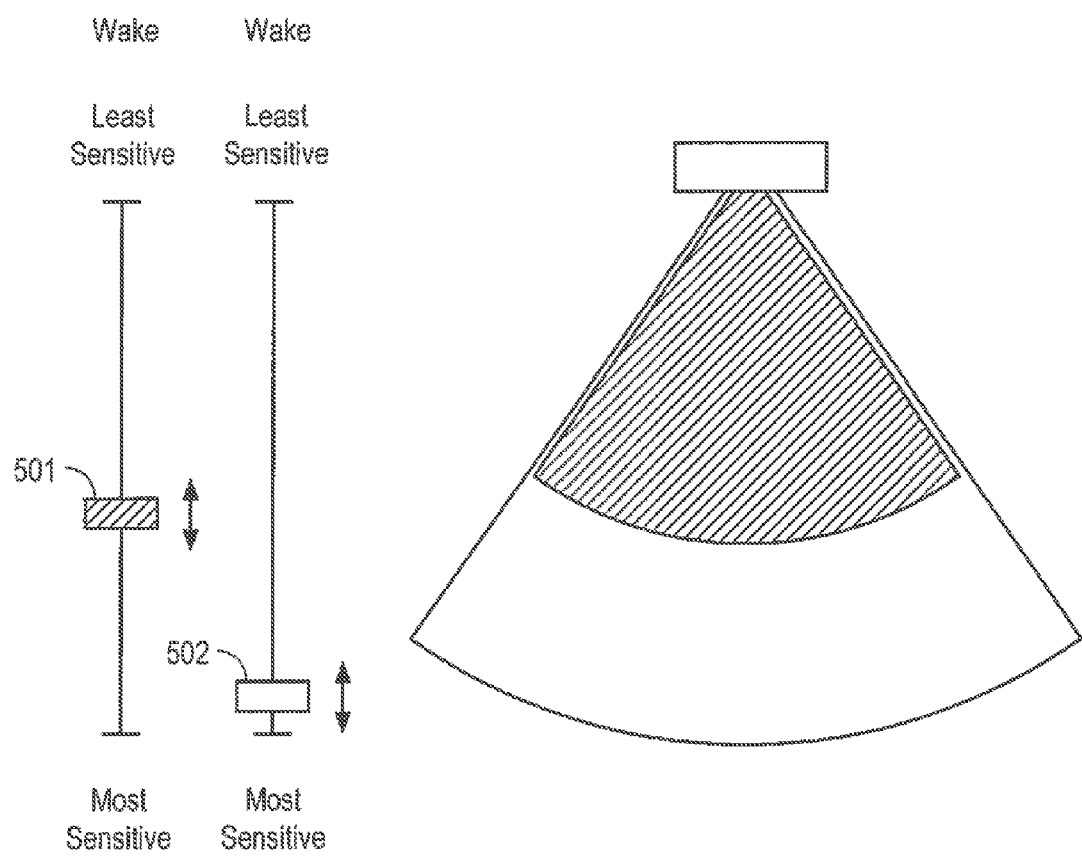
FIG. 5 illustrates adjustment of an occupancy sensor.

In one embodiment, the occupancy sensor has various settings to control sensitivity, range or other parameters, and an IWB system may use more than one set of sensor settings. One setting, referred to herein as a "wake" setting, may be used in the "off" state to detect activity nearby the display system and cause the IWB system to transition to the "prepare" state. A second setting, referred to herein as a "turn off" setting, maybe be used when determining that there has been no activity for some time in the "prepare", "active" or "login" states. In one embodiment, the sensitivity is higher for the "turn off" setting than for the "wake" setting. FIG. 5 shows an example of a user interface with sliders 501 and 502 to control two settings between sensitivity levels. Settings may also be adjusted with supervised or unsupervised learning.

An Example of a Computer System

FIG. 6 is a block diagram of a computer system 600 that may be used to practice an embodiment of the present invention. In one embodiment, computer system 600 may be used to implement controller 106 illustrated in FIG. 1 and described above. As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for enabling the various components and subsystems of computer system 600 to communicate with each other as intended. Although bus subsystem 604 is shown schematically as a single bus, alternative embodiments of the bus subsystem may utilize multiple busses.

Network interface subsystem 616 provides an interface to other computer systems, networks, and storage. Network interface subsystem 616 serves as an interface for receiving data from and transmitting data to other systems from computer system 600. For example, network interface subsystem 616 of an IWB system may enable a controller to communicate with other remotely located IWB systems via a communication network such as the Internet.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable storage medium for storing the basic programming and data constructs that provide the functionality of the present invention. Software (programs, code modules, instructions) that when executed by a processor provide the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a phone, a portable computer, a workstation, a network computer, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The teachings described above may be applied to any system comprising a processor that can be booted or rebooted. For example, while embodiments have been described above using IWB systems as examples, this is not intended to be restrictive. The teachings described above and recited in the claims may also be practiced by other computing systems that enable automated logout process that allow content that was created prior to logout to be saved.

Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

We claim:

1. A system comprising:
    a memory; and
    a processor coupled to the memory and operable to:
        adjust a sensitivity of an occupancy sensor for detecting presence of individuals in proximity to the occupancy sensor, the sensitivity adjusted from a first lower sensitivity to a higher sensitivity in response to detecting one or more individuals in proximity to the occupancy sensor;
        capture writing for a session on a display surface of the system, convert the captured writing to a digital representation of the writing, and store a local copy of the digital representation of the writing in the memory, and
        log out the user, delete the local copy of the digital representation of the writing from the session, and place one or more system hardware components in a reduced power consumption state based on:
            occupancy sensor data indicating absence of the one or more individuals in proximity to the occupancy sensor, and
            activity information associated with the display surface,
        wherein the processor is operable to
            adjust the sensitivity of the occupancy sensor for detecting presence of individuals from the higher sensitivity to a second lower sensitivity based on the occupancy sensor data indicating absence of the one or more individuals, and
            delete the local copy of the digital representation of the writing after a determination that user logout has been initiated based on the occupancy sensor data and the activity information and after a determination that data corresponding to the digital representation of the writing has been stored at a remote storage location.

2. The system defined in claim 1 wherein the activity information comprises data corresponding to content displayed on the display surface
    a) as a result of one or more users interacting with the display surface, or
    b) from a remote location.

3. The system defined in claim 1 wherein locally stored data that comprises user credential data and content data of the user is deleted after a determination that the user logout has been initiated based on the occupancy sensor data and the activity information and after a determination that data corresponding to the digital representation of the writing has been stored at the remote storage location.

4. The system defined in claim 1 wherein the processor is operable to save content displayed on the display surface at the time the user is logged out.

5. The system defined in claim 1 wherein the processor removes from view content displayed on the display surface at a time of logging out the user after the determination that the user logout has been initiated based on the occupancy sensor data and the activity information and after the determination that data corresponding to the digital representation of the writing has been stored at the remote storage location.

6. The system defined in claim 1 further comprising a projector operable to project information on the display surface, and wherein the one or more system hardware components comprises the projector or the display surface.

7. The system defined in claim 1 wherein the display surface is part of a board having sensors to detect writing and drawing on the display surface.

8. The system of claim 1, wherein the processor is operable to
    transfer one or more system hardware components from a reduced power consumption state to an operative state based on occupancy sensor data indicating detection of the one or more individuals in proximity to the occupancy sensor, and
    adjust the sensitivity of the occupancy sensor from the lower sensitivity to the higher sensitivity in response to the occupancy sensor data indicating the detection of the one or more individuals, wherein the lower sensitivity is for detecting individuals within a first range of the system while the system is in the reduced power consumption state, and the higher sensitivity is for detecting individuals within a second range of the system while in the operative state, wherein the second range is greater than the first range.

9. A method for controlling a system comprising:
detecting one or more individuals in proximity to an occupancy sensor;
adjusting a sensitivity of the occupancy sensor for detecting presence of individuals in proximity to the occupancy sensor from a first lower sensitivity to a higher sensitivity in response to the detection of the one or more individuals;
converting writing captured during a session on a display surface of the system to a digital representation of the writing;
storing a local copy of the digital representation of the writing in a memory;
receiving data that includes occupancy sensor data indicating absence of the one or more individuals in proximity to the occupancy sensor, and activity information associated with a display surface;
adjusting the sensitivity of the occupancy sensor for detecting presence of individuals from the higher sensitivity to a second lower sensitivity based on the occupancy sensor data indicating absence of the one or more individuals;
determining when user logout of the session has been initiated based on the occupancy sensor data and the activity information and that the data corresponding to the digital representation of the writing has been stored at a remote storage location; and
in response to the determination, logging out the user, deleting the local copy of the digital representation of the writing from the session, and placing one or more system hardware components in a reduced power consumption state based on the data.

10. The method defined in claim 9 wherein the activity information comprises data corresponding to content displayed on the display surface
   a) as a result of one or more users interacting with the display surface, or
   b) from a remote location.

11. The method defined in claim 9, further comprises:
deleting locally stored data that comprises user credential data and content data of the user in response to the determination.

12. The method defined in claim 9 further comprising saving content displayed on the display surface at a time the user is logged out.

13. The method defined in claim 9 further comprising:
removing from view content displayed on the display surface at the time of logging out the user in response to the determination.

14. The method defined in claim 9 wherein the one or more system hardware components comprises a projector or the display surface.

15. The method defined in claim 9 wherein the display surface is part of a board having sensors to detect writing and drawing on the display surface.

16. A method for controlling a first system comprising:
receiving a first set of occupancy sensor data indicating no individuals are in proximity to an occupancy sensor in the first system;
adjusting a sensitivity of the occupancy sensor for detecting presence of individuals in proximity to the occupancy sensor, the occupancy sensor adjusted from a higher sensitivity when individuals are in proximity the occupancy sensor to a lower sensitivity based on the first set of occupancy sensor data indicating no individuals are in proximity to the occupancy sensor;
receiving activity information indicating no activity for a predetermined period of time with regard to a display surface of the first system, including data indicating that no activity occurred with respect to a second system, remote from, but communicatively connected to, the first system; and
logging out a user from the first system and placing one or more system hardware components of the first system in a reduced power consumption state based on the first set of occupancy sensor data and the activity information.

17. The method defined in claim 16 further comprising removing stored data including one or more of user credential data and content data of the user.

18. The method defined in claim 16 further comprising:
saving content displayed on the display surface to a cloud-based storage location at a time the user is logged out.

* * * * *